United States Patent [19]
Van Meter et al.

[11] 3,971,824
[45] July 27, 1976

[54] p-BENZOYLOXYBENZOATE

[75] Inventors: James P. Van Meter; Bruce H. Klanderman, both of Rochester, N.Y.

[73] Assignee: Eastman Kodak Company, Rochester, N.Y.

[22] Filed: June 11, 1975

[21] Appl. No.: 585,919

Related U.S. Application Data

[60] Division of Ser. No. 388,516, Aug. 15, 1973, Pat. No. 3,915,883, which is a continuation-in-part of Ser. No. 247,563, April 26, 1972, abandoned.

[52] U.S. Cl. ............................................... 260/473 R
[51] Int. Cl.² .......................................... C07C 69/76

[58] Field of Search ............................... 260/473 R

[56]            References Cited
            UNITED STATES PATENTS 3,836,478    9/1974    Green et al. .................... 260/473 R

*Primary Examiner*—Paul J. Killos
*Attorney, Agent, or Firm*—Henry M. Chapin

[57]            ABSTRACT

Liquid crystalline materials comprised of substituted phenyl p-benzoyloxybenzoates are useful in electro-optical elements. These materials have low crystal to mesophase transition temperatures and have a broad mesophase temperature range.

2 Claims, 1 Drawing Figure

U.S. Patent  July 27, 1976  3,971,824
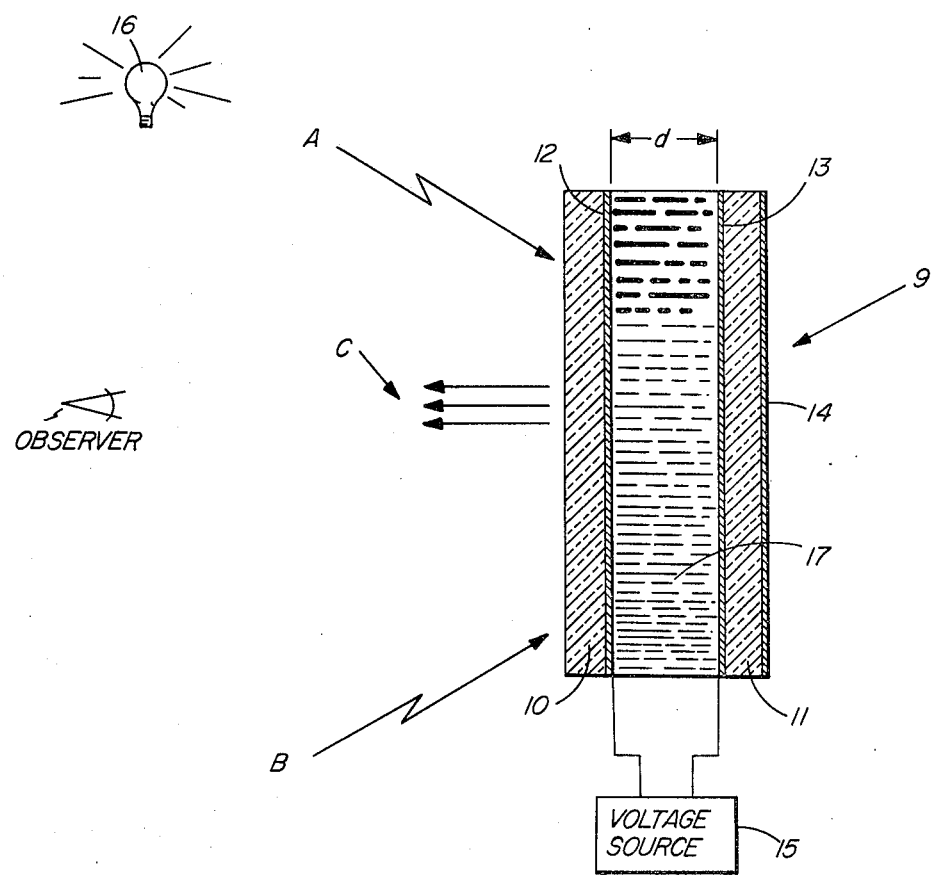

P-BENZOYLOXYBENZOATE

This application is a division of application Ser. No. 388,516 which was filed Aug. 15, 1973 and granted as Pat. No. 3,915,883 on Oct. 28, 1975; and which was a continuation-in-part of abandoned application Ser. No. 247,563, filed Apr. 26, 1972.

FIELD OF THE INVENTION

This invention relates generally to liquid crystalline compositions. More particularly, the invention relates to novel nematic liquid crystalline materials and mixtures and the use thereof in electro-optical devices.

BACKGROUND OF INVENTION

Nematic liquid crystalline compositions are used in various electro-optical devices which involve the modulation of light, such as light valves and optical display devices. Such light valves typically are controlled by an electric field and operate when the liquid crystalline material is in its mesomorphic state. Generally, when no electric field is applied to a nematic liquid crystalline material, a device containing a thin layer of this material is relatively transparent to light. When an electric field is applied to the liquid crystalline material above a threshold value, the device appears to become opaque in the region of the field. This opacity is believed to be due to the scattering of light by domains of the liquid crystal molecules which align themselves in the field. A dynamic scattering effect is seen when the aligned molecules are perturbed by ions "bumping" into them and causing movement thereof.

The electro-optical effect due to alignment of domains of the nematic liquid crystal molecules in an electric field may be employed in transmissive, reflective, or absorptive-type flat-panel displays, in light shutters, and in other applications.

Nematic liquid crystalline materials exhibit a characteristic thread texture when properly viewed, and this texture is believed to be the boundaries of many domains or clusters in which the liquid crystalline molecules have a fixed orientation. According to the cluster theory of nematic liquid crystals, the clusters are randomly oriented, which accounts for the light scattering properties and for the turbid appearance of a fairly large volume. In addition, nematic liquid crystalline molecules typically are electrically and magnetically anisotropic. Thus, upon the application of an electric or magnetic field to a layer of randomly oriented nematic liquid crystals, the clusters tend to become oriented in a particular direction. This orientation results in changes in the light-scattering and birefringent properties of the layer. The degree of orientation attained by the molecules usually is dependent upon the magnitude of the applied field. Accordingly, the light-scattering properties and birefringent properties of a layer of nematic liquid crystalline material can be modulated with an electric or magnetic field.

Numerous examples of liquid crystalline materials have been described in the literature. However, to date, there is little certainty involved in predicting the exact properties of any hypothetical liquid crystalline compound. In view of this lack of predictability, the search continues for suitable nematic liquid crystalline compounds. From the standpoint of ease of handling, it is desirable to have materials which have low crystal to mesomorphic transition temperatures and preferably the liquid crystalline materials should have a broad temperature range over which the nematic phase exists.

DESCRIPTION OF PRIOR ART

Recently, Dewar and Goldberg reported in *J. Org. Chem.* 35, 2711 (1970) the preparation of liquid crystalline p-phenylene esters of para-substituted benzoic acids (Type A) and para-substituted phenyl esters of terephthalic acids (Type B) as shown below.

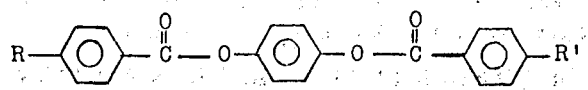

Type A

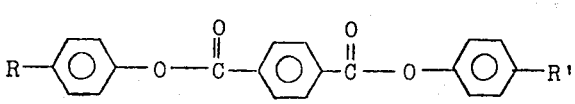

Type B

These materials have crystal to mesophase transition temperatures above 100°C and mesomorphic ranges of 35° to 90°. S. L. Arora et al. described in *J. Org. Chem.* 35, 4055, (1970) liquid crystalline 2-methyl-1,4-phenylene esters of para-substituted benzoic acids (Type A). These materials have lower crystal to mesophase transition temperatures than the corresponding unsubstituted hydroquinone derivatives.

Excluding consideration of the methyl substituent in the Arora et al. compounds, the liquid crystalline compounds described in the references above may be viewed as being derived from the symmetrical intermediates — hydroquinone or terephthalic acid. In addition, the terminal substituents R and R' are equivalent, thus adding to the symmetry of the molecule. Recently, S. A. Haut et al., described in Abstracts of Papers, 162nd ACS National Meeting, Washington, D.C., Sept. 12–17, 1971, the preparation of a series of liquid crystalline compounds in the Type A class in which the two terminal substituents R and R' were not equivalent. It was found that this increase in dissymmetry resulted in lower crystal to mesophase transition temperatures. W. Kast in *Landolt-Börnstein*, 6th ed., Springer, Berlin, 1960, Vol. II, Part 2a, p. 266, reported the only known unsymmetrical derivatives which have the formula below (Type C).

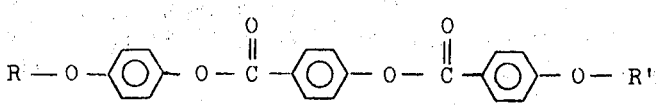

Type C

This class of liquid crystals may be viewed as derivatives of the unsymmetrical molecule p-hydroxybenzoic acid. All reported examples have high crystal to mesophase transition temperatures and, with one exception, rather short mesomorphic ranges.

SUMMARY OF THE INVENTION

In accordance with this invention, novel substituted phenyl p-benzoyloxybenzoate nematic liquid crystalline materials are provided which exhibit low crystal to mesomorphic transition tempeatures and have a broad mesomorphic temperature range. These materials are useful in electro-optical cells or elements.

BRIEF DESCRIPTION OF DRAWINGS

The FIGURE 1 is a schematic sectional view of an electro-optical display device of the invention.

DESCRIPTION OF PREFERRED EMBODIMENTS

The objects and advantages of this invention are provided by liquid crystalline materials which are substituted phenyl-p-benzoyloxybenzoates having the formula:

I. 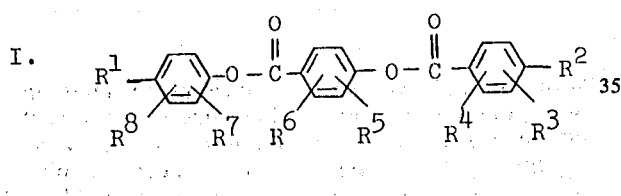

wherein:

One of the terminal substituents $R^1$ and $R^2$ represents (a) an alkyl group having from 1 to about 18 carbon atoms and typically having 1 to about 12 carbon atoms such as methyl, ethyl, isopropyl, isobutyl, octyl, decyl, dodecyl, pentadecyl, etc., and including the corresponding substituted alkyl groups having small, polar substituents containing no more than 8 atoms (preferably no more than 5 atoms) such as methoxy, ethoxy, cyano, halogen and similar substituents or (b) a cyano group; and the other of $R^1$ and $R^2$ represents (a) an alkyl group as described above or (b) an alkoxy group having 1 to about 18 carbon atoms and typically having 1 to about 12 carbon atoms such as methoxy, ethoxy, isobutoxy, hexoxy, dodecoxy, etc. and including the corresponding substituted alkoxy groups having small, polar substituents as described above for the alkyl group; and at least one of the lateral substituents $R^3$, $R^4$, $R^5$, $R^6$, $R^7$ and $R^8$ represents a cyano group or a halogen atom (chlorine, fluorine, etc.) and the remaining substituents represent relatively small moieties typically containing no more than about 8 atoms and preferably no more than about 4 atoms such as a methyl group, an ethyl group, a methoxy group, a cyano group or a halogen atom (e.g., Cl, F, etc.), a nitro group; of course, all of the remaining substituents can also be hydrogen atoms.

Especially useful compounds are those of the formula I above wherein:

one of $R^1$ and $R^2$ represents (a) an alkyl group including substituted alkyl as described above having 1 to about 12 carbon atoms or (b) a cyano group; and the other of $R^1$ and $R^2$ represents (a) an alkyl group having 1 to about 12 carbon atoms as described above or (b) an alkoxy group including substituted alkoxy as described above having 1 to about 12 carbon atoms in the alkyl moiety; and at least one of $R^3$, $R^4$, $R^5$, $R^6$, $R^7$ and $R^8$ represents (a) a cyano group in which case the remaining substituents are selected from a hydrogen atom, a methyl group, a halogen atom and a nitro group or (b) a halogen atom in which case the remaining substituents represent hydrogen.

Among the preferred compounds from the standpoint of physical properties are compounds of the formula:

II. 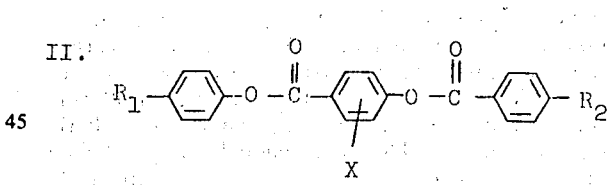

wherein:

$R_1$ is an alkyl group having about 4 to 8 carbon atoms (e.g., isobutyl, pentyl, hexyl, heptyl, octyl); $R_2$ is (a) an alkyl group having about 4 to 8 carbon atoms as described for $R_1$ or (b) an alkoxy group having 4 to 8 carbon atoms (e.g., isobutyloxy, pentyloxy, hexyloxy, heptyloxy, octyloxy); and X is a halogen atom, preferably chlorine.

Exemplary of various useful compounds described above are those given in Table I below along with their indicated transitional temperature ranges:

Table 1

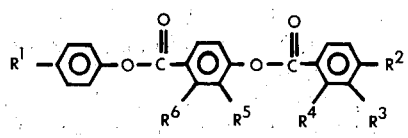

| Compound Number | R¹ | R⁶ | R⁵ | R⁴ | R³ | R² | Range °C.* | ΔT °C. |
|---|---|---|---|---|---|---|---|---|
| 1 | $OC_8H_{17}$ | H | Cl | H | H | $OC_8H_{17}$ | 75S81N148 | 73 |
| 2 | $OC_8H_{17}$ | H | Cl | H | H | $C_5H_{11}$ | 70N138 | 68 |
| 3 | $C_5H_{11}$ | H | Cl | H | H | $OCH_2CH(CH_3)_2$ | 94N126 | 32 |
| 4 | $C_5H_{11}$ | H | Cl | H | H | $OC_5H_{11}$ | 70N151 | 81 |
| 5 | $C_5H_{11}$ | H | H | H | Cl | $OC_5H_{11}$ | 119N168 | 49 |
| 6 | $C_5H_{11}$ | H | Cl | H | Cl | $OC_5H_{11}$ | 83N123 | 40 |
| 7 | $C_5H_{11}$ | H | Cl | H | H | $OC_{12}H_{25}$ | 73.5N126 | 52.5 |
| 8 | $C_5H_{11}$ | H | Cl | H | H | $C_5H_{11}$ | 67N130 | 63 |
| 9 | $OC_8H_{17}$ | H | Cl | H | H | $OCH_3$ | 91N169.5 | 78.5 |
| 10 | $C_5H_{11}$ | H | Cl | H | H | $C_7H_{15}$ | 55N119 | 64 |
| 11 | $C_8H_{17}$ | Cl | H | H | H | $CH_3$ | 78N117.5 | 39.5 |
| 12 | $C_8H_{17}$ | Cl | H | H | H | $C_7H_{15}$ | 39N104.5 | 65.5 |
| 13 | $C_8H_{17}$ | Cl | H | H | H | $OC_{12}H_{25}$ | 85S114N121 | 36 |
| 14 | $C_8H_{17}$ | H | Cl | H | H | $C_7H_{15}$ | 70N106 | 36 |
| 15 | $C_8H_{17}$ | Cl | H | H | H | $C_{12}H_{25}$ | 57S88N98 | 41 |
| 16 | $C_5H_{11}$ | H | H | Cl | H | $OCH_3$ | 109N168.5 | 59.5 |
| 17 | $C_8H_{17}$ | Cl | H | H | H | CN | 96S153N168 | 72 |
| 18 | $C_8H_{17}O$ | Cl | H | H | H | $OC_8H_{17}$ | 76.5S91N145 | 68.5 |
| 19 | $C_5H_{11}$ | Cl | H | H | H | $OCH_2CH_2OCH_3$ | 70N141 | 71 |

| Compound Number | R¹ | R⁶ | R⁵ | R⁴ | R³ | R² | Range °C. | T °C. |
|---|---|---|---|---|---|---|---|---|
| 20 | $C_5H_{11}$ | Cl | H | H | H | $C_5H_{11}$ | 39N122 | 83 |
| 21 | $C_5H_{11}$ | Cl | H | H | H | $C_4H_9$ | 41N117.5 | 76.5 |
| 22 | $C_5H_{11}$ | Cl | H | Cl | H | $OC_5H_{11}$ | 59N86 | 27 |
| 23 | $C_5H_{11}$ | Cl | H | H | H | $OC_5H_{11}$ | 62N128 (crude) | 66 |
| 24 | $C_4H_9$ | Cl | H | H | H | $C_5H_{11}$ | 44N118 | 64 |
| 25 | $C_5H_{11}$ | H | H | H | CN | $OC_5H_{11}$ | 78S159N165 | 87 |
| 26 | $C_5H_{11}$ | H | Cl | H | Cl | $OC_{10}H_{21}$ | 82N111 | 29 |
| 27 | CN | Cl | H | H | H | $OC_5H_{11}$ | 64N190 | 126 |

*N refers to the nematic range
S refers smectic range

Mixtures of the liquid crystalline materials of this invention are especially useful in that compositions can be formed which have a very low crystal to mesomorphic transition temperature. Particularly useful are compositions containing about 35 to 65% by weight of one compound having Formula II above together with about 65 to 35% by weight of a different compound having Formula II above. Useful mixtures can also contain other substituted phenyl p-benzoyloxybenzoates having Formula I above. In addition, useful mixtures as described above can further contain simple esters such as the various p,p'-substituted phenyl benzoates such as those having the formula:

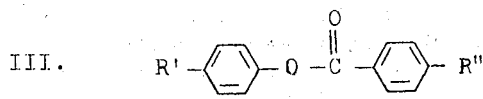

wherein one of R' and R" is an alkyl or alkoxy group having 1 to about 12 carbon atoms (preferably about 1 to 8 carbon atoms) and the other of R' and R" is also an alkyl or alkoxy group as just described or a cyano group. Mixtures containing such simple esters can be comprised of (a) about 5 to 70% by weight of the simple ester with (b) about 95 to 30% by weight of at least one compound having Formula I as described above. Useful results are obtained with only up to about 10 to 30% by weight of such simple esters with the remainder comprising a mixture of compounds having Formula II above.

A 1:1 mixture by weight of Compound No. 12 with Compound No. 20 gives a composition having a mesomorphic temperature range of 3 to 112°C. A 1:1:3:3 weight ratio mixture of p-pentylphenyl p-methoxybenzoate, p-pentylphenyl p-propylbenzoate, 4-pentylphenyl 2-chloro-4-(4-pentylphenylbenzoyloxy)benzoate (Compound No. 20) and 4-pentylphenyl 4-(4-pentyloxy-3-cyanobenzoyloxy)benzoate (Compound No. 25) exhibits useful liquid crystalline properties and is a liquid at room temperatue.

The compounds of this invention are typically prepared by reacting the appropriately substituted benzoyl chloride with a substituted phenyl p-hydroxybenzoate in a suitable reaction medium such as pyridine. The reaction can be conducted at most any convenient temperature and generally is conducted at room temperatue. The desired substituted phenyl p-hydroxybenzoate can be prepared by the technique of W. W. Lowrance, Jr., *Tetrahedron Letters*, 3453 (1971). Representative preparatory techniques are described further in the following examples.

EXAMPLE 1

Preparation of 4-pentylphenyl 2-chloro-4-hydroxybenzoate

To a suspension of p-pentylphenol (0.15 mole) and 2-chloro-4-hydroxybenzoic acid (0.10 mole) in toluene (500 ml.) is added concentrated sulfuric acid (0.5 g.) and boric acid (0.31 g.) (5 mole percent). The reaction mixture is refluxed for 29 hours under a Dean-Stark trap. The solvent is then removed under reduced pressure and the product is washed with ligroin. The resulting 4-pentylphenyl 2-chloro-4-hydroxybenzoate is recrystallized from an ethanol/water mixture to give 25.6 g., 81% of pure product, m.p. 149°–151°C.

EXAMPLE 2

4-n-pentylphenyl 2-chloro-4-(4-pentylbenzoyloxy)-benzoate

A mixture of 4-pentylphenyl 2-chloro-4-hydroxybenzoate (0.0075 mole) prepared as in Example 1 and p-pentylbenzoyl chloride (0.0075 mole) in pyridine (35 ml.) is stirred at room temperature for 5 hours. The reaction mixture is then poured into ice-water. The product is filtered and washed with water to give 4-n-pentylphenyl 2-chloro-4-(4-pentylbenzoyloxy)benzoate (3.1 g., 84%), m.p. 38°–122°C. The analytical sample, m.p. 39°–122°C is obtained by chromatography on Florisil and crystallization from ethanol. The theoretical values calculated for $C_{30}H_{33}ClO_4$ and the values actually found are as follows:

Calculated: C 73.1; H, 6.7; Cl, 7.2;
Found C, 72.8; H, 7.0; Cl, 6.9.

EXAMPLE 3

Compound No 27 is prepared by stirring in pyridine a mixture of (A) 2-chloro-4-(4-pentyloxybenzoyloxy)-benzoyl chloride and (B) p-cyanophenyl. After stirring for 8 hours at room temperature the reaction mixture is poured into ice-water and stirred for 30 minutes. The product is filtered off and purified chromatographically. Reactant (A) above is prepared by mixing p-pentyloxybenzoyl chloride with 2-chloro-4-hydroxybenzoic acid in pyridine. After heating this mixture, it is allowed to stand for 4 hours, whereupon the mixture is poured into ice-water and stirred. The produce (Reactant A) is filtered off and any remaining p-pentyloxybenzoic acid is removed by Soxhlet extraction.

The compounds of this invention are useful in electro-optical display devices. A typical cell used in forming electro-optical devices is analogous to a parallel plate capacitor containing a liquid crystalline material as the dielectric. The plates are conductive and at least one of the plates is transparent. When no potential is applied across the two plates or walls, the cell appears substantially transparent. Upon the application of a d.c. or low frequency a.c. signal across the plates, the liquid crystalline material typically turns milky white. This white or cloudy condition is referred to as a scattering mode. In many scattering electro-optical cells, the cell becomes substantially transparent again when the voltage is removed.

The FIGURE illustrates an optical display device 9 comprised of transparent cell walls 10 and 11 which are conductive, typically having a conductive layer 12 and 13 of, for example, indium oxide on the inner surfaces thereof. The walls 10 and 11 are usually spaced apart a distance d typically in the range of about 2 to about 250 microns with best results usually being obtained with a spacing of about 3 to about 100 microns. Liquid crystalline material 17 is contained within cell walls 10 and 11.

The layer of liquid cyrstalline material 17 is subjected to an electric field of sufficient magnitude to alter or modulate the light scattering properties of the layer. The light scattering property of material 17 is not affected until the electric field reaches a certain minimum threshold value. This value depends, of course, on the particular material or combination of materials being used, but is typically about $10^4$ volts per centimeter of layer thickness. In order to subject the layer to an electric field, display device 9 includes a voltage source 15 for applying a suitable electrical potential across conductive layers 12 and 13. The potential applied can be direct voltage, including pulsed direct voltage, or low-frequency alternating voltage and typically has a value between about 4 V. and about 80 V.

Device 9 can optionally have a reflective coating 14 when used in the reflective mode. Light source 16 can be positioned on either side of device 9. Source 16 would be on the side of device 9 opposite the observer when used in the transmissive mode. If used in the reflective mode, source 16 is located on the same side as the observer and typically is positioned so that the incident light is directed as shown by arrow A. In the zero or ground state, light which is not transmitted is reflected at an angle equal to the angle of incidence as shown by arrow B. When a voltage is applied, say, 15 V., the cell is placed in the scattering mode and, therefore, the angle of reflected light now changes until it is essentially normal to the plane of cell 10 as shown by arrows C.

The cell configuration can be in the form of two spaced walls having thereon conductive strips with the strips of one wall being arranged orthogonal to those of the other wall to form an x–y grid. Each strip has a separate electrical connection to a voltage source. In this manner, a cross-conductor, addressable cell is formed which allows one to selectively apply the voltage necessary for dynamic scattering to any desired portion of the grid. By the use of suitable logic, solid-state electronic systems can be utilized to address a large scale cell of this type and display alphanumeric information.

Various addenda can be used in minor proportions with the present compounds and compositions. For example, when used in a dynamic scattering mode, it may be desirable to add various ionic species to the liquid crystalline material. Useful materials would include ionic surface active agents having a long chain paraffinic substituent as well as the ionic addenda described in Heilmeier et al U.S. Pat. No. 3,499,112. Also aligning agents can be added if desired. Such agents provide homeotropic alignment of the liquid crystal molecules and some find use in other than dynamic scattering cells. These agents are further described in copending Bucher U.S. application Ser. No. 218,243, filed Jan. 17, 1972, and entitled LIQUID CRYSTAL COMPOSITIONS (now abandoned). Representative aligning agents are monomeric, nonionic surface-active agents such as secondary or tertiary amines and ureas having at least one paraffinic substituent. Such addenda as the latter amines and ureas, for example, would typically be added in a molar ratio of liquid crystalline compound to additive of about $1:10^{-4}$ to about $1:10^{-6}$.

The following example demonstrates an embodiment of cells utilizing the present materials.

EXAMPLE 4

A cell is constructed of two Nesa coated glass electrodes separated with a 1 mil. Teflon spacer. Compound No. 6 of Table I is placed in the cell which is thermostatically controlled to maintain Compound No. 6 in its nematic phase. A potential of 35 volts AC is applied across the cell. The application of this potential results in the scattering of incident light. Similar results are obtained with other materials described herein.

Dynamic scattering electro-optical cells are included as a representative embodiment of the present invention. The described compounds and compositions of this invention are also useful in other types of light modulating cells in addition to those involving a current flow phenomena as in dynamic scattering. The present materials have utility in so-called field effect cells as well. Other useful electro-optical cells or elements can contain a mixture of the present nematic materials together with cholesteric molecules. Cells of this latter type usually have information storage capability and are described further by G. H. Heilmeier in "Liquid Crystal Display Devices," *Sci. Amer.*, p. 100, April, 1970. In addition, the present materials can be used in various acousto-optical and mechano-optical cells as described, for example, in Dreyer U.S. Pat. No. 3,597,043, issued Aug. 3, 1971.

The invention has been described in detail with particular reference to certain preferred embodiments thereof, but it will be understood that variations and modifications can be effected within the spirit and scope of the invention.

We claim:

1. A liquid crystalline compound of the formula:

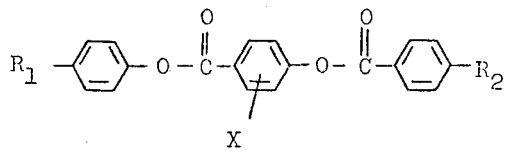

wherein:
$R_1$ is an alkyl group of about 4 to 8 carbon atoms,
$R_2$ is an alkyl group of about 4 to 8 carbon atoms or an alkoxy group having about 4 to 8 carbon atoms, and
X is a halogen atom.

2. A liquid crystalline compound as described in claim 1 wherein $R_1$ and $R_2$ each represent an alkyl group of about 4 to 8 carbon atoms.

* * * * *